Patented Sept. 20, 1949

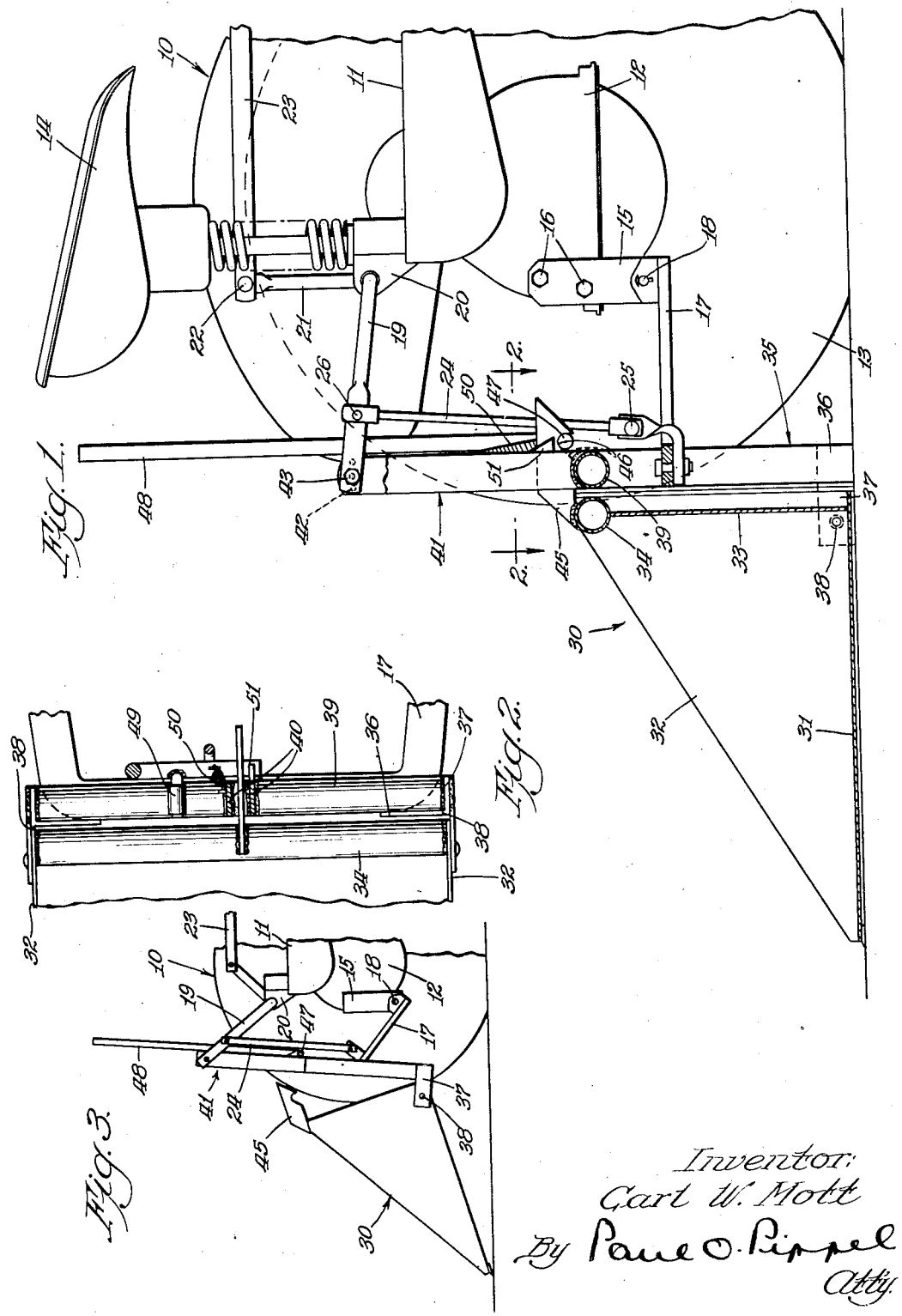

2,482,286

UNITED STATES PATENT OFFICE 2,482,286

TRACTOR-MOUNTED MATERIAL SCOOP

Carl W. Mott, La Grange, Ill., assignor to International Harvester Company, a corporation of New Jersey Application November 22, 1946, Serial No. 711,730

12 Claims. (Cl. 214—140)

This invention concerns a material handling implement. More specifically, it concerns a quick detachable material handling scoop mounted upon a mobile power unit such as a tractor.

It is a prime object of this invention to provide a material handling scoop which may be quickly attached and detached to and from a tractor.

It is another object to provide a material handling scoop which may be attached to the drawbar structure at the rear of the tractor by means of a single point of connection.

It is still another object to provide a material handling scoop mounted at the rear of a tractor in position to load upon rearward movement of the same, said material scoop having a single point of connection to a lifting arm mounted on a tractor.

It is a still further object to provide a material handling scoop which is mounted at the rear end of the tractor, said mounting means including a single point of connection to a lifting arm which is connected to the tractor, said scoop also having means engaging portions of the drawbar to restrain relative lateral and longitudinal movement between the scoop and said draw-bar.

It is still another object to provide an improved lifting connection for a material handling scoop which is mounted at the rear of the tractor, said lifting connection comprising a movable drawbar which in cooperation with a lifting means and a frame for the scoop forms a parallel linkage connection.

Other objects of this invention will become more apparent as the description proceeds when read in connection with the accompanying drawings in which:

Fig. 1 is a side elevational view of the rear portion of a tractor having a material handling scoop connected thereto;

Fig. 2 is a sectional plan view taken along the line 2—2 of Fig. 1; and

Fig. 3 is a diagrammatic view in elevation, said scoop having one end lifted with respect to the ground, and the other end of the scoop resting upon the ground in a dumping position.

Referring particularly to Fig. 1, the rear portion of a tractor is generally designated by the reference character 10. The tractor 10 consists of a body structure 11 having connected thereto a pair of depending axle housings 12, only one of which is shown. The axle housings 12 are supported by ground wheels 13. An operator's station 14 is mounted and supported at the rear of the body portion 11. A pair of brackets 15, only one of which is shown, are connected by means of bolts 16 to each of the depending axle housings 12. A bail shaped draw-bar structure 17 has each of its free ends pivotally connected to the brackets 15 by means of pins 18.

A longitudinally extending lifting arm 19 is pivotally journalled about a transverse axis on a bracket 20 rigidly secured to the body structure 11. A vertically extending crank arm 21 is connected to the lifting arm 19 and is in turn pivotally connected as indicated at 22 to a forwardly extending link 23. The link 23 may be connected to a manual detent lever, not shown, or may be connected to a suitable power means which may be readily controlled from the operator's station. Such a power means is clearly disclosed in applicant's Patent 2,399,756, dated May 7, 1946. A lifting link 24 is pivotally connected, as indicated at 25, to the draw-bar structure 17 of the tractor. Link 24 extends vertically and is pivotally connected as indicated by the reference character 25 to the lifting arm 19.

A material handling implement is generally indicated by the reference character 30. The material handling implement 30 generally consists of a shovel-type scoop having a bottom 31, side portions 32 and a closed end portion 33. A transversely extending tubular element 34 rigidly secures the side portions 32 and the end portion 33. The scoop is connected to the rear end of the tractor by means of a vertically extending forkshaped frame generally indicated by the reference character 35. The fork-shaped frame 35 consists of a pair of vertically extending angle members 36 having at their lower portions a pair of rearwardly extending straps 37 to which the material handling implement 30 is pivotally connected as indicated at 38. A tubular element 39 is rigidly secured to the upper end of each of the angle members 36 and extends transversely with respect thereto. A pair of spaced straps 40 are rigidly connected to the tubular member 39 and extend vertically with respect thereto to form a supporting member 41. The straps 40 have at their upper ends a plurality of aligned openings 42. A bolt extends through one of the openings of each of the straps 40 for pivotally securing the supporting member 41 to the lifting arm 19. As best shown in Figs. 1 and 2, the vertically extending angles 36 are formed with laterally spaced side portions 37 and back portions 38. The laterally spaced side portions 37 and the back portions 38 engage complementary portions of the draw-bar 17 in telescoping engagement, whereby the material handling implement is held against lateral and longitudinal forward movement with respect to said draw-bar.

A release mechanism for permitting dumping of the scoop is provided by means of a latch member 45 which is rigidly secured to the transverse tubular element 34. The latch member 45 is provided with a notch 46 which engages a transverse portion 47 of a vertically extending manual release lever 48. The release lever 48 is pivoted on the transverse tubular element 39 as indicated at 49. A spring 50 normally holds the transverse pin 47 in locking engagement with the latch 45. An element 51 is connected to the transverse tubular element 39 and provides a stop against which the transverse portion 47 may rest when the material handling implement 30 is released to a dumping position.

It is readily apparent that the material handling implement 30 may be quickly attached and detached from the tractor by merely inserting the bolt 43 through the supporting member 41 and through the lifting arm 19. No other means of connection is necessary. The draw-bar 17 is in free telescoping engagement or relation with the space formed by the back portion 38 and the side portions 37 of the vertically extending members 36. Thus the scoop is secured against lateral and longitudinal forward thrust when the tractor is being operated rearwardly to pick up a load of material. The single point of connection by means of the bolt 43 is sufficiently loose so that the scoop, by virtue of its own pendulum type of connection, will readily resume its telescoping or engaging position with respect to the tractor draw-bar should the scoop become laterally displaced during the working operation. During the operation the operator controls the power unit, not shown, which in turn moves the link 23 causing upward or downward movement of the lift arm 19. The lifting link 24, the frame 35, and the draw-bar 17 form a parallel linkage, and as the lifting arm 19 is raised, the tractor draw-bar 17 and the scoop is raised from the ground. When it is desired to dump the load that has been gathered, the operator simply actuates the lever 48, thus releasing the latch element 45 to permit dumping of the scoop.

It is thus apparent that an improved material handling implement has been provided which can be quickly and easily detached or attached to a tractor by means of a single point of connection, the single point of connection also being the lifting arm by which the implement is adjusted with respect to the ground. A unique construction has also been provided for restraining the implement against lateral and longitudinal displacement with respect to the tractor, the said construction being of simple and inexpensive design.

It is to be understood that modifications may be made in this construction which do not depart from the spirit of the invention as disclosed nor as defined within the scope of the appended claims.

What is claimed is:

1. In combination, a tractor, a draw-bar, a lifting arm on said tractor, means connecting said lifting arm to said draw-bar, a quick detachable material handling implement including a scoop, a vertical member having laterally spaced shoulder portions engaging complementary edges of said draw-bar in free telescoping relation to restrain relative lateral and longitudinal forward movement between said member and said draw-bar, and means pivotally connecting said vertical member to said lifting arm, said means providing a single point of connection for said ground working implement, whereby said implement may be quickly attached and detached from said tractor.

2. In combination, a tractor, a draw-bar pivotally connected to said tractor, means for vertically moving one end of said draw-bar including a lifting arm on said tractor, means connecting said lifting arm to said draw-bar, a quick detachable material handling implement including a scoop, a vertical member having laterally spaced shoulder portions engaging complementary edges of said draw-bar in free telescoping relation to restrain relative lateral and longitudinal forward movement between said members, and means pivotally connecting said vertical member to said lifting arm, said means providing a single point of connection for said ground working implement whereby said implement may be quickly attached and detached from said tractor.

3. In combination, a tractor, a draw-bar pivotally connected to said tractor, means for vertically moving one end of said draw-bar including a lifting arm on said tractor, a lifting link connected to said lifting arm and said draw-bar, a quick-detachable material handling implement comprising a scoop, said scoop being positioned to load upon rearward movement of said tractor, a vertical member having laterally spaced shoulder portions engaging complementary edges of said draw-bar in free telescoping relation to restrain relative lateral and longitudinal forward movement between said members, and means connecting said vertical member to said lifting arm, said means providing a single point of connection for said ground working implement whereby said implement may be quickly attached and detached from said tractor.

4. In combination, a tractor, a draw-bar pivotally connected to said tractor, means for vertically lifting one end of said draw-bar including a lifting arm pivotally connected to said tractor, a lifting link pivotally connected to said lifting arm and to said draw-bar, a quick detachable material handling implement comprising a scoop, a U-shaped member having laterally spaced shoulder portions freely engaging complementary edges of said draw-bar to restrain said scoop from relative lateral and longitudinal forward movement with respect to said draw-bar, means pivotally connecting said scoop to said U-shaped member, a vertical supporting member rigidly connected to said U-shaped member, and means pivotally connecting said vertical supporting member to said lifting arm, said means providing a single point of connection for said ground working implement.

5. In combination, a tractor, a draw-bar pivotally connected to said tractor, means for vertically lifting one end of said draw-bar including a lifting arm pivotally connected to said tractor, a lifting link pivotally connected to said lifting arm and to said draw-bar, a quick detachable material handling implement comprising a scoop, a U-shaped member having laterally spaced shoulder portions engaging complementary edges of said draw-bar to restrain said scoope from relative lateral and longitudinal movement with respect to said draw-bar, means pivotally connecting said scoop to said U-shaped member, a vertical supporting member rigidly connected to said U-shaped member, means pivotally connecting said vertical supporting member to said lifting arm, said means providing a single point of connection for said ground working implement, and latch means connecting said scoop and said transverse element whereby said scoop may be released for dumping.

6. In combination, a tractor, a draw-bar on said tractor, means for vertically lifting one end of said draw-bar structure including a lifting arm pivotally connected to said tractor, a lifting link pivotally connected to said lifting arm and to said draw-bar, a quick detachable material handling implement comprising a scoop having an open and a closed end, said scoop being positioned to load upon rearward movement of said tractor, a plurality of vertical laterally spaced angle members associated with said scoop, each angle member having portions cooperating with edges of said draw-bar to restrain said scoop from relative lateral and longitudinal movement with respect thereto, means pivotally connecting said scoop to said angle members, a supporting member rigidly connected to said transverse element, means pivotally connecting said supporting member to said lifting arm, said means providing a single point of connection for said ground working implement, and releasable latch means associated with said scoop whereby the said scoop may be released for dumping.

7. In combination, a tractor having axle housings supported on ground wheels, a draw-bar pivotally connected to said axle housings, means for vertically lifting said draw-bar including a lifting arm pivotally connected to said tractor and extending rearwardly over said draw-bar, a lifting link pivotally connected to said lifting arm and to said draw-bar, a quick detachable material handling implement comprising a scoop having an open and a closed end, said scoop being positioned to load upon rearward movement of said tractor, a plurality of vertical laterally spaced angle members positioned adjacent the closed end of said scoop, each angle member abutting edges of said draw-bar to restrain said scoop from relative lateral and longitudinal movement with respect thereto, means pivotally connecting said scoop to said angle members, a supporting member rigidly connected to said transverse element, and means pivotally connecting said supporting member to said lifting arm, said means providing a single point of connection for said ground working implement.

8. In combination, a tractor having axle housings supported on ground wheels, a draw-bar pivotally connected to said axle housings, means for vertically lifting said draw-bar including a lifting arm pivotally connected to said tractor and extending rearwardly over said draw-bar, a lifting link pivotally connected to said lifting arm and to said draw-bar, a quick detachable material handling implement comprising a scoop having an open and a closed end, said scoop being positioned to load upon rearward movement of said tractor, a plurality of vertical laterally spaced angle members positioned adjacent the closed end of said scoop, each angle member abutting edges of said draw-bar to restrain said scoop from relative lateral and longitudinal movement with respect thereto, means pivotally connecting said scoop to said angle members, a supporting member rigidly connected to said transverse element, means pivotally connecting said supporting member to said lifting arm, said means providing a single point of connection for said ground working implement, and latch means connecting said scoop and said transverse element whereby said scoop may be released for dumping.

9. In combination, a tractor having rear depending axle housings supported on ground wheels, a draw-bar structure on said tractor, said draw-bar structure including a bail member having its free ends pivotally connected to said depending axle housings, means for vertically lifting said draw-bar structure including a lifting arm pivotally connected to said tractor and extending rearwardly over said bail member, a lifting link pivotally connected to said lifting arm and to said bail member, a quick detachable material handling implement comprising a scoop having an open and a closed end, said scoop being positioned to load upon rearward movement of said tractor, a pair of vertical laterially spaced angle members positioned adjacent the closed end of said scoop, portions of each angle member engaging edges of said bail member to restrain said scoop from relative lateral and longitudinal movement with respect to said bail member, means pivotally connecting the lower portion of said scoop to the lower ends of said angle members, a supporting member rigidly connected to said transverse element, means pivotally connecting said supporting member to said lifting arm, said means providing a single point of connection for said ground working implement, and latch means connecting said scoop and said transverse element whereby said scoop may be released for dumping.

10. In combination, a tractor, a draw-bar pivotally connected to said tractor, means for vertically moving one end of said draw-bar including a lifting arm connected to said tractor, a lifting link pivotally connected to said lifting arm and said draw-bar, a material handling implement comprising a scoop, a frame connecting said scoop to said tractor, including a vertical member having laterally spaced shoulder portions engaging edges of said draw-bar in free telescoping relation to restrain said scoop from relative lateral and longitudinal forward movement with respect to said draw-bar, means pivotally connecting the upper portion of said frame to said lifting arm in spaced relation from the point of connection of said lifting link, said means providing a single point of connection whereby said implement may be quickly attached and detached from said tractor, said frame, lifting arm, lifting link and draw-bar forming a substantially parallel linkage arrangement whereby said scoop may be adjusted with relation to the ground.

11. In combination, a tractor, a draw-bar pivotally connected to said tractor, means for vertically lifting one end of said draw-bar including a lifting arm pivotally connected to said tractor, a lifting link pivotally connected to said lifting arm and to said draw-bar, a quick detachable material handling implement comprising a scoop; means engageable between said scoop and said tractor to restrain said scoop from relative lateral movement with respect to said tractor, a supporting member connected to said scoop, and means pivotally connecting said supporting member to said lifting arm, said means providing a single point of connection for said ground working implement whereby said implement may be quickly attached and detached from said tractor.

12. In combination, a tractor, a draw-bar connected to said tractor, a lifting arm pivotally connected to said tractor, a quick detachable material handling implement comprising a scoop, means on said scoop telescopingly engageable with said draw-bar to restrain said scoop from relative lateral movement with respect to said draw-bar, a supporting member connected to said scoop, and means pivotally connecting said scoop to said lifting arm, said means providing a single point of connection for said ground working implement whereby said implement may be quickly attached and detached from said tractor.

CARL W. MOTT.

REFERENCES CITED

The following references are of record in the file of this patent:

UNITED STATES PATENTS

| Number | Name | Date |
|---|---|---|
| 2,254,292 | Jones | Sept. 2, 1941 |
| 2,326,197 | Blecha | Aug. 10, 1943 |
| 2,330,847 | Seal | Oct. 5, 1943 |
| 2,352,466 | Arps | June 27, 1944 |
| 2,398,585 | Hayward | Apr. 16, 1946 |
| 2,427,575 | Sedore | Sept. 16, 1947 |